Patented Aug. 14, 1928.

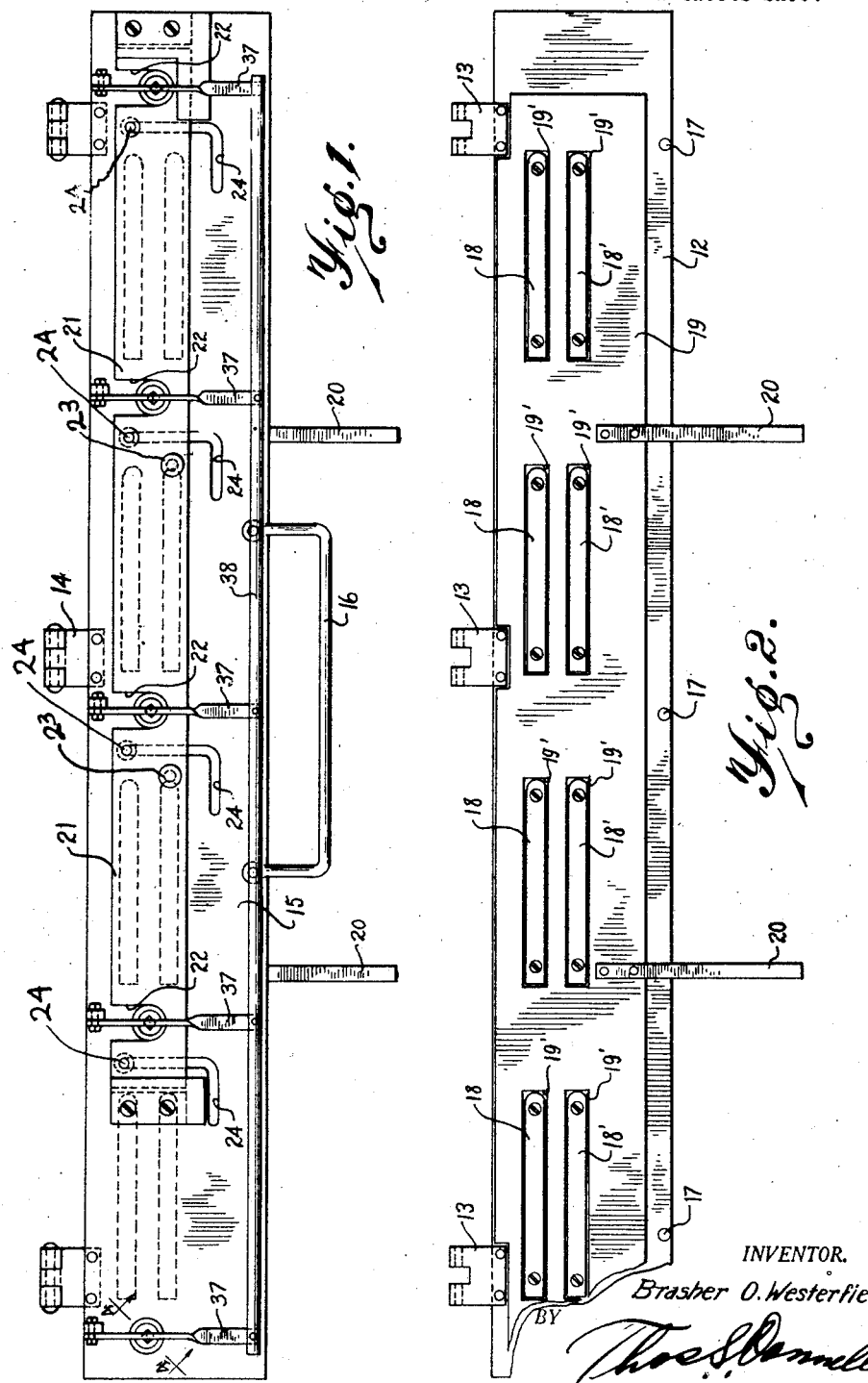

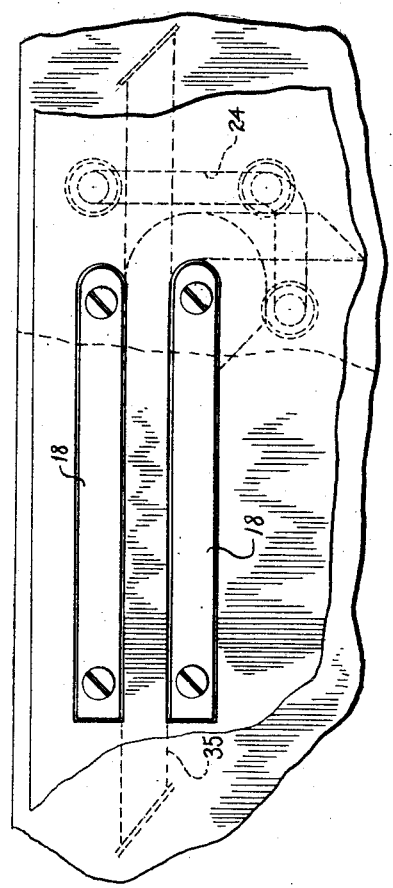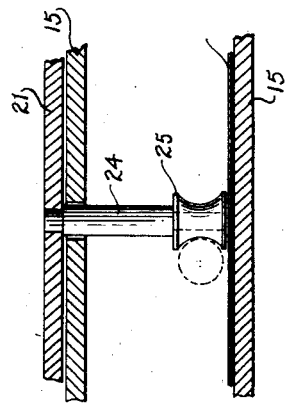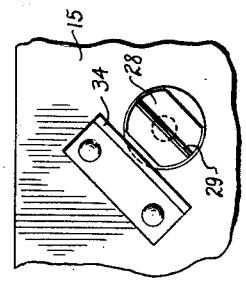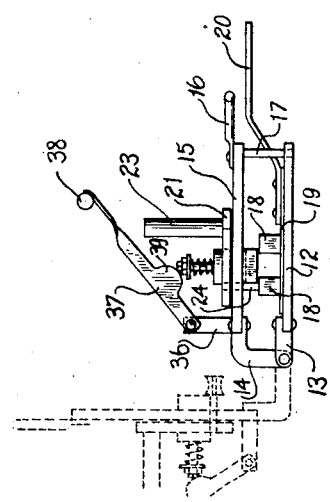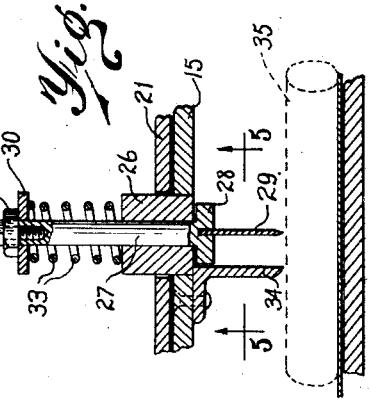

1,680,440

UNITED STATES PATENT OFFICE.

BRASHER O. WESTERFIELD, OF DETROIT, MICHIGAN, ASSIGNOR OF ONE-HALF TO EDGAR C. COX, OF DETROIT, MICHIGAN.

CANDY-FORMING MACHINE.

Application filed November 21, 1921. Serial No. 516,519.

My invention relates to a new and useful improvement in a candy forming machine and has for its object the provision of mechanical means for forming a crook on a stick or strip of candy.

Another object of the invention is to provide means in a candy forming machine for cutting a strip of candy into separate parts so that the same may be formed into canes.

Another object is the provision in a candy forming machine of means for cutting a strip of candy into several parts so that each part will possess a definite form of termination.

Another object of the invention is the provision in a candy forming machine of an abutment around which a strip of candy may be pressed so as to form a crook therein.

Another object of the invention is the provision in a candy forming machine of means for pressing a strip of candy around a crook forming member.

Another object of the invention is the provision of a candy forming machine which will be simple in structure, economical of manufacture and highly efficient in use.

Other objects will appear hereinafter.

The invention consists in the combinations and arrangements of parts hereinafter described and claimed.

The invention will be best understood from the accompanying drawings which form a part of this specification and in which Fig. 1 is a top plan view of the invention, Fig. 2 is a top plan view of the base and tray used in the invention, Fig. 3 is a sectional view taken on substantially line 3—3 of Fig. 1, Fig. 4 is a sectional view taken on substantially line 4—4 of Fig. 1, Fig. 5 is a plan view taken on line 5—5 of Fig. 4, Fig. 6 is an enlarged plan view of one of the forming members, Fig. 7 is an enlarged sectional view illustrating one of the forming members and roller thereto attached.

The invention relates to a candy forming machine and is designed principally for forming candy canes in which one end of the strip of candy is doubled upon the main portion to form the crook of the cane. With candy canes of this class it is desired that the ends of the cane be cut diagonally inasmuch as it is almost impossible to tell whether or not the stick has been broken where a square cut is made. Means are provided in the invention to make such a cut.

The invention comprises a base 12 projecting from the rearward side of which are hinge plates 13 which form one of the straps of the hinge, the other strap comprising an L shaped member 14 which is secured to a cover 15, said cover being provided adjacent its center with a handle 16. The cover is, through the medium of the hinges, pivotally mounted on the base 12 so as to allow the same to be raised to open position as shown in dotted lines in Fig. 3, the cover being shown in closed position in full. Projecting upwardly from the base, at intervals, are stops 17 which engage the cover when the same is in closed position. Mounted upon the base 12 are forming members which serve as abutments when the crook of the candy stick is being formed. It is to be noted that these forming members are rounded at one end so as to present a circular surface to the candy strip. These strips are secured to the base by screws, bolts or in any other suitable manner. A tray 19 is positioned loosely on the base 12 and is provided with slots 19' which accommodate the forming members 18 and 18' so as to allow the same to project therethrough. Suitable handles 20 are provided on the tray so that the pieces of candy may be removed when the forming process is completed.

Mounted slidably on the cover is a longitudinally extending strip or sheet of metal 21 provided at proper intervals with notches or recesses 22, the purpose of which will appear hereinafter. Projecting upwardly from and rigidly attached to the slidable member 21 are handles 23 whereby said plate 21 may be moved as required. Rigidly attached to the plate 21 and projecting downwardly therefrom through slots 24' formed in the cover are pressing members 24, said members being each provided adjacent its lower end with a roller 25, one of said members being provided for each set of forming members and designed to cooperate therewith when in operation.

Mounted in the cover, at proper intervals, are blocks 26 in each of which is slidably mounted a stem 27 which projects beyond said cover and is provided at its lower end with a head 28 in which is secured a blade 29. Positioned upon each of said stems, adjacent the upper end thereof, is a washer 30 which is retained in position by a suitable nut 31 and lock bolt 32. Assembled on said stem in an embracing position intermediate said washer and the upper surface of said block 26 is a spiral spring 33. Mounted on the under surface of the cover is an angle iron 34 which serves as a guide for said blade. Projecting upwardly from said cover is a bar 36 to the upper end of which is pivotally mounted an arm 37. It will be noted that there is one of said arms for each knife and that the number of knives exceeds the number of forming sets by one. These arms 37 are all connected by a bar 38 so that all of said knives may be operated simultaneously.

In operation the strip of candy from which the candy canes are to be made is laid in position on the tray which is positioned on the base, the strip lying between the forming members which serve as a guide for the strip. The candy is laid in position while the cover is in the position shown in dotted lines in Fig. 3. The cover is then lowered and the strip which extends from end to end of the device is then cut into several parts depending upon the size of the machine. In the device shown the strip would be cut into four pieces, leaving scraps at each end. The cutting is effected by a downward pressure on the bar 38, the spring 33 serving to return the knives to elevated position when the pressure is released from the bar 38 after the cutting is effected. The plate 21 is then moved forwardly of the device so as to carry the studs 24 toward the base of the L shaped slots 24'. The plate in so moving causes the studs, or the rollers on the studs 24 to engage the strip of candy adjacent the end thereof so as to carry this end into engagement with the end of the forming member, thus forming an L shaped strip. The plate 21 is then moved toward the left until the studs engage the ends of the slots. The rollers 25 which are in engagement with the strip of candy thus cause the base of the L shaped stick of candy to be pressed around the rounded end of the forming members thus forming the crook of the cane. The plate 21 is then moved to its normal position after which the cover is raised to open position. The tray 19 may then be removed to deposit the candy canes in a receptacle. The recesses 22 are formed in the plate 21 so as to accommodate the blocks 26. The purpose of the rollers is believed to be apparent as well as is their function. It is to be noted that the knives 29 are so positioned as to cut the strip diagonally of its length.

While I have illustrated the preferred form of construction I do not wish to limit myself to the precise form of construction herein set forth but desire to avail myself of all the variations and modifications which come within the scope of the appended claims.

Having thus described my invention what I claim as new and desire to secure by Letters Patent is:

1. A candy forming machine comprising a strip receiving portion; means for dividing said strip into a plurality of parts; a plurality of forming members; and means for forcing a portion of each of said parts around one of said members for forming a crook adjacent one end of each of said parts simultaneously.

2. A candy forming machine comprising a candy receiving portion; means for dividing the candy into a plurality of strips; means for forming a crook adjacent one end of each of said strips; and independent means for operating said dividing means and said crook-forming means.

3. A candy forming machine comprising a candy receiving portion; a cover therefor; forming members; means adapted for co-operating with said forming members for forming a crook on a stick of candy adjacent one end thereof; said cover having slots for guiding said cooperating means.

4. A candy forming machine comprising a strip receiving portion; a tray mounted on said receiving portion and movable relatively thereto; and means for forming a crook on said strip adjacent one end thereof.

5. A candy-forming machine comprising a strip-receiving portion adapted for the reception of a strip of candy; means for dividing said strip into a plurality of parts; a plurality of forming members; a means for forcing a portion of said parts around one of said members for forming a crook adjacent one end of each of said parts.

6. A candy-forming machine comprising a strip-receiving portion adapted for the reception of a strip of candy; a plurality of forming members mounted on said strip-receiving portion a plurality of cutting members movable respectively to said strip-receiving portion, adapted for cutting said strip into a plurality of parts; a means for co-operating with each of said forming members for forming a crook on each of said parts adjacent one end thereof, the remaining portion of said parts being maintained in elongated form.

In testimony whereof I have signed the foregoing specification at Detroit, Wayne County, Michigan.

BRASHER O. WESTERFIELD.